Jan. 19, 1937. F. C. BINNALL Re. 20,246
VALVE
Original Filed Oct. 3, 1932 2 Sheets-Sheet 1
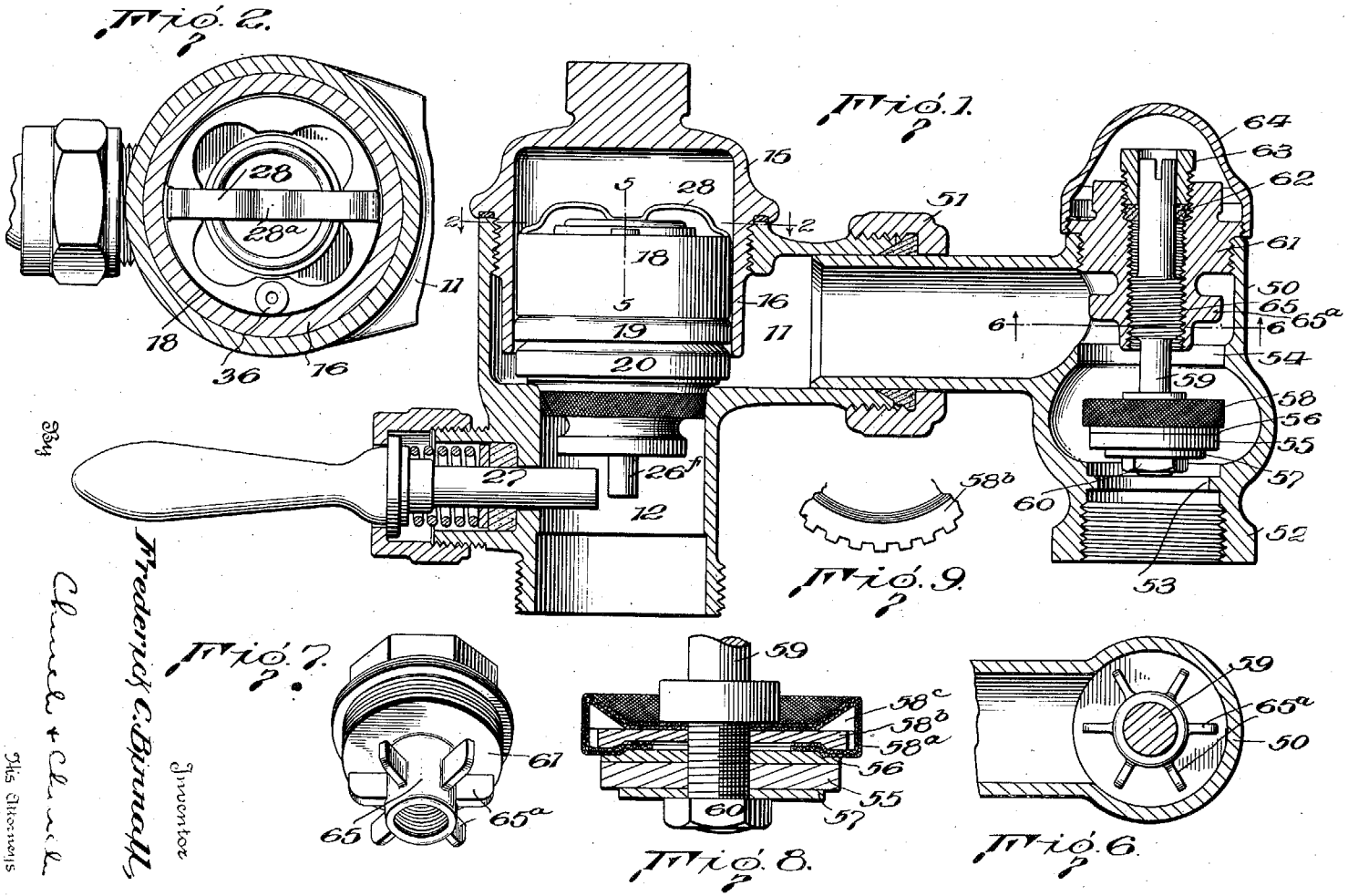
Inventor
Frederick C. Binnall,
By Church + Church
His Attorneys Jan. 19, 1937. F. C. BINNALL Re. 20,246
VALVE
Original Filed Oct. 3, 1932 2 Sheets-Sheet 2
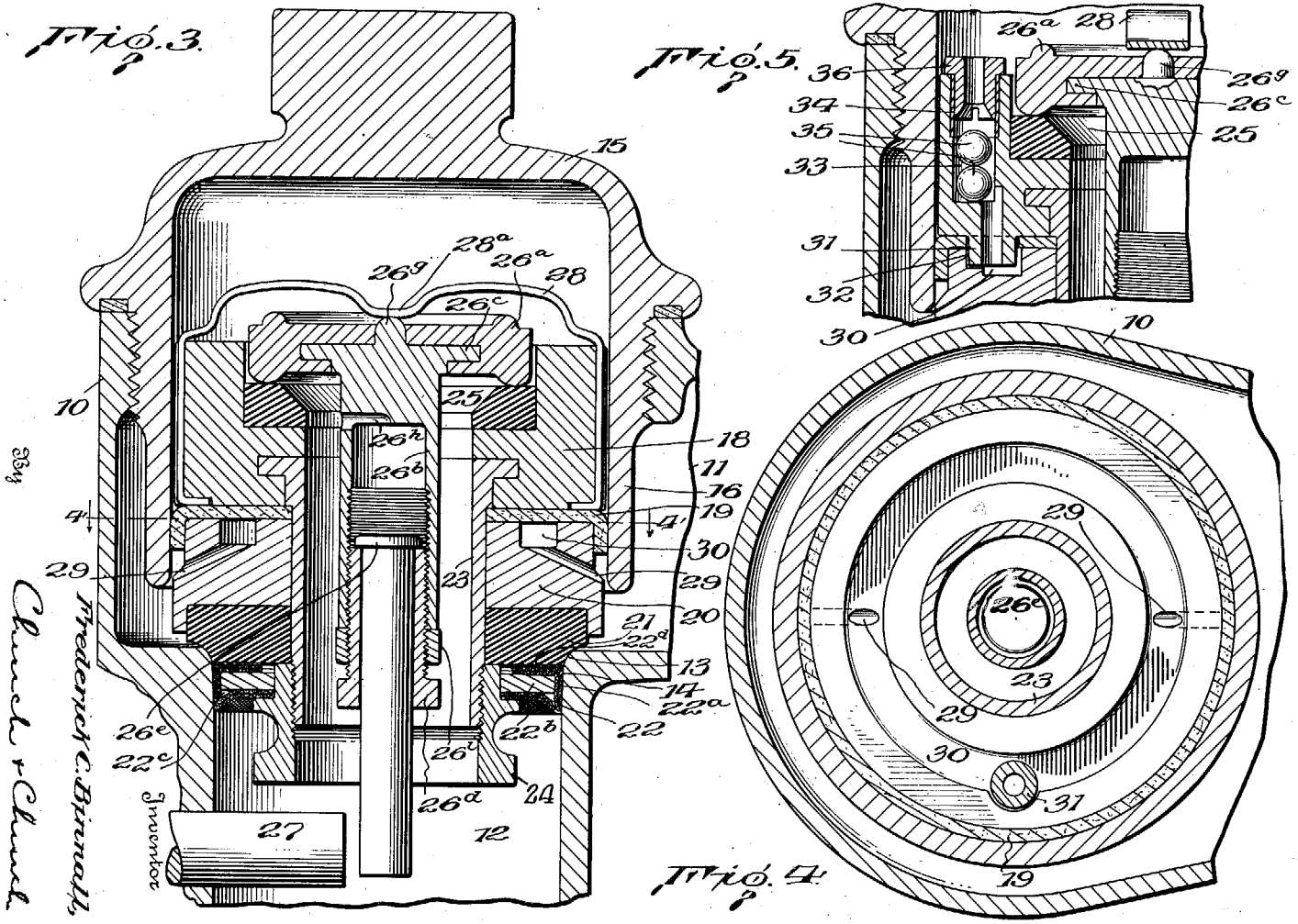

Reissued Jan. 19, 1937

Re. 20,246

UNITED STATES PATENT OFFICE 20,246

VALVE

Frederick C. Binnall, Wilmington, Del.

Original No. 2,026,506, dated December 31, 1935, Serial No. 636,060, October 3, 1932. Application for reissue November 14, 1936, Serial No. 110,944

30 Claims. (Cl. 137—93)

My invention relates to improvements in valves and has to do, more particularly, with valves for controlling the flow of water and other liquids.

It is the primary object of my invention to provide a valve construction for checking or throttling liquid flow in supply lines which is completely silent in operation.

It is an object of my invention to provide a flush valve construction of general application which will not generate line or other noises, even when used on supply lines having pressures up to several hundred pounds per square inch.

It is an object of my invention to provide a self-metering flush valve of general application, the flush of which may be regulated, and which will provide uniformity of flush within extremely close limits, regardless of the manner in which the device is tripped.

It is an object of my invention to provide a self-metering flush valve which is not subject to the formation of deposits upon its working parts, and in which the timing passages are self-cleaning and free from tendency to clog.

It is an object of my invention to provide a flush valve employing a vulcanized rubber seat member and a valve element seatable thereon which will not be pitted by the sulphur content of the rubber seat member.

It is an object of my invention to provide, in a flush valve, a tiltable timing chamber relief valve having a telescoping stem which is adjustable to regulate the flush and which is free from tendency to bind or stick.

It is an object of my invention to provide a flush valve for closet bowls which will silently provide a uniform refill therein after the flushing operation has taken place.

It is an object of my invention to provide a combined cut-off and adjustable throttle valve for use in conjunction with the supply line of a flushing valve, which throttle valve, when employed to choke down a high pressure supply, will not set up so-called "wire drawing" noises characteristic of prior art devices heretofore used for the same purpose.

It is an object of my invention to provide a flush valve, the several moving parts of which are assembled as a single unit capable of marketing as a replacement element, which unit may be replaced without special tools or skill.

It is an object of my invention to provide a flush valve which is less subject to wear and the development of trouble than similar devices now in use, and which may be manufactured by production methods for a fraction of the cost of such prior art devices.

It is an object of my invention to provide a silencer for liquid-flow controlling valves which may be made to precision form by production methods for an extremely low cost.

Further objects, and objects relating to details and economies of construction and operation will definitely appear to those skilled in the art from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings forming a part of this specification in which:

Figure 1 is a vertical sectional view of a flush valve construction constituting a preferred embodiment of my invention, the piston valve and throttle valve being shown in elevation;

Fig. 2 is a horizontal sectional view taken on the line 2—2 of Fig. 1;

Fig. 3 is a fragmentary vertical sectional view through the valve shown in Fig. 1, disclosing the piston valve and the relationship existing between the parts thereof when in closed position;

Fig. 4 is a horizontal sectional view taken on the line 4—4 of Fig. 3;

Fig. 5 is a fragmentary sectional view taken on the line 5—5 of Fig. 1, showing the self-cleaning chamber charging duct;

Fig. 6 is a horizontal sectional view of a part of the throttle valve and taken on the line 6—6 of Fig. 1;

Fig. 7 is a view in perspective of the throttle valve carrying head member;

Fig. 8 is a vertical sectional view of the throttle valve head showing the construction of the silencing member thereof; and Fig. 9 is a fragmentary view of a portion of the disc-like core of the throttle-valve silencing member, showing its toothed or milled peripheral edge.

The same reference numerals refer to the same parts throughout the several views.

In its broad sense, my invention consists in the discovery of the causes of sound emission in devices for throttling or choking down liquid flow from high pressure sources of supply, and in the provision of means capable of original incorporation or subsequent installation in such devices for precluding the generation of such sounds. Fundamentally, my invention consists in so designing the walls of the throttling throat as to preclude the formation of the fluid stream into a sharply defined high velocity jet, which design consists, in a large part, in the provision of porosity or liquid perviousness in a portion of the throat-defining wall structure. While not so limited, my invention has especial merit in connection with liquid-metering flush valves and preferably includes, in such valves, the provision of means for assuring uniformity of flush and freedom from clogging.

More specifically and with reference to the accompanying drawings in which I have disclosed a typical embodiment of my invention in a flush valve, there is shown a valve casing 10 having an inlet port 11, an outlet port 12 and a convex main valve seat portion 13 intermediate the inlet and outlet ports merging, with a slight straight tapered portion 14, into the casing wall constituting the port 12. A detachable casing cap 15 is provided which has a depending cylindrical flange 16 formed integral therewith, the lower portion of which extends partially across the inlet port 11 and is spaced from the valve seat 13 and the walls of the casing 10 to constitute a baffle for the inlet port 11, providing an annular passageway by which the inflowing liquid is gently and uniformly directed around and through the valve seat 13 and port 12 when the valve is open. The cap 15, with its cylindrical flange 16, also constitutes a timing chamber within which the main valve plunger is disposed and slides vertically in accordance with changes in pressure within the timing chamber. The main valve plunger comprises a head member 18, a skirt member 20, both preferably of molded synthetic resin derived from phenol-formaldehyde condensation, a packing member 19 intermediate said head and skirt portions, a valve-constituting member 21 of semi-hard vulcanized rubber received within the base of the skirt member 20, and a silencing member 22. Each of the above named plunger parts are centrally apertured and are held in assembly by a tubular element 23, the upper end of which is molded into the head member 18 and the lower end of which is provided with threads upon which is mounted the assembly nut 24. The upper portion of the plunger head 18 is provided with a recess about its central aperture, within which recess a valve seat member 25 of relatively soft vulcanized rubber is retained, upon which member is normally seated the head **26*a* of the timing chamber control valve. The timing chamber control valve is of unique construction and consists of a tubular stem section 26*b* formed, at its upper end, into a spider 26*c* about which the head portion 26*a* of sulphur-resistant synthetic resin is molded. The tubular stem section 26*b* depends through the tubular portion 23 of the plunger valve and has its lower portion internally threaded to longitudinally adjustably receive the bushing 26*d*. A control valve stem has a top portion 26*e* seatable upon the top of the bushing 26*d*, and a shank portion 26*f* slidable therein constitutes the lower end of the control valve stem and is adapted to be operatively engaged solely by the end of the manually operable trip mechanism 27 to tilt the stem and unseat the valve head 26*a*. A clip 28 of resilient non-corrosive metal, such as Monel, has its ends received within notches formed in the plunger head 18 and is provided with a central depending portion 28*a* engageable with a central upstanding tilt 26*g* formed on the tubular stem section 26. For the purpose of venting the tubular stem section 26*b* so as to permit free movement of the stem extension 26*f* in the bushing 26*d*, a vent aperture 26*h* is provided adjacent the spider portion 26*c*. Bushing 26*d* is maintained in its adjustment relative to stem section 26*b* by a lock nut 26*i*. A series of ducts are provided in the plunger valve for timingly recharging the timing chamber after the control valve has been operated to lift the plunger valve. The several ducts constituting the series are progressively larger in size from the inlet to the outlet termini of the series so as to preclude the tendency of suspended solid particles or impurities from becoming lodged therein. The inlet passage of the series is constituted by the clearance (approximately 1/64 of an inch) between the plunger skirt 20 and the cylinder 16. Liquid from the inlet port 11 enters therethrough and passes to the annular recess formed immediately beneath the skirt of the packing member 19, from whence it passes by a diametrically opposed pair of similar ducts 29 having a diameter of approximately 1/10 of an inch to a second and internal annular recess 30 of larger size than the previous passageways. Plunger head 18 is formed with a tubular projection 31 which is received in an enlargement 32 in the recess 30 and prevents relative rotation between the head member 18 and skirt member 19 of the plunger. The passageway through the member 31 is substantially 3/32 of an inch in diameter and is disposed substantially intermediate the ducts 29. The passageway in member 31 is eccentrically connected to a ball-receiving recess 33 in the head 18, which recess 33 is bushed at its upper end with a thin metallic sleeve 34 molded into the head 18. Two balls 35 of somewhat less diameter than the recess 33 are loosely disposed therein, retained by a tubular member 36 press fitted into the bushing 33. The ball-retaining member 36 is provided with an outlet bore having a diameter substantially 1/8 of an inch, which bore is countersunk at its inner end, and which countersink is slotted at diametrically opposite sides to provide a liquid by-pass or chamber refill leak of definite, predetermined capacity when the upper of the balls 35 rises under the impulse of the liquid flowing in the recess 33 and seats in the countersunk portion of the member 36**.

A major feature of the flush valve construction above described is its silent action during all stages of operation. This silence of action is due primarily to the flange 16 of the cap providing an annular passageway from the inlet port 11 to the valve seat 15 and outlet port 12, and the joint form of the valve member and associated silencing member 22. As has been stated, the valve seat 13 is convex in form and merges with the casing wall defining the outlet port with a slight straight taper, that is a taper of from 5% to 10%, preferably about 7%. The semi-hard vulcanized rubber valve ring 21 and its contiguous silencing member 22 are complementary to the valve seat 13 and the adjacent tapered casing portion; the member 21 having its valve-seat-engaging face of concave form and its subjacent portion of slightly conical form, merging with the conical form of the member 22. The conical portion of the member 21 is solid in character, whereas the member 22 consists of a wire gauze annulus **22*a* die pressed about a core 22*b* of solid metal but extended therebelow at its periphery to constitute a hollow portion 22*c* of greater porosity. The disclosed member 22 is thus increasingly pervious to liquid from its upper, valve-member-adjacent end to its lower hollow extremity, and, when more and more deeply inserted in the port 12 by the plunger, gradually permits less and less liquid to pass the valve seat 13 and adjacent tapered portion 14** of the casing wall.

The complementary formation of the valve seat 13 and the adjacent portion of outlet passage 12 and the seating portion of valve 21 and the refill member 22, is of especial importance because it prevents "water hammer", as the valve 21 approaches its seat. It is well known that, in flush valves as heretofore constructed, "water hammer" has been regarded as inevitable. This has been due to the surge of water pressure set up in the supply pipe in the instant just preceding the complete cessation of flow effected by the seating of valve 21. Where the supply pressure is high, this results in a very disagreeable hammering noise and, in some cases, the pressure peak created by the surge has been great enough to burst the pipe. I have found that this may be prevented, to a very large extent, by making the valve seat and the seating portion of the valve of complementary form and, likewise, the periphery of the refill member 22 and the portion of the outlet passage with which it cooperates.

The flush valve construction above described will function with complete silence at all stages in its operation when employed with an unthrottled water supply of proper delivery, that is, from 25 to 30 gallons per minute. However, due to the extreme differences in water pressure in various localities as well as at different levels in the same locality, some means of throttling or regulating liquid delivery to the valve must be provided. Moreover, a cut-off should also be installed in the supply line so that the valve may be inspected or repaired without shutting off the main water supply main of the building. Accordingly, in Fig. 1, I have disclosed, as a part of my flush-metering device, a combined means for completely cutting off the supply of liquid to the flush valve proper as well as for silently regulating the rate of delivery to the valve so that the valve, when flushed, may supply to the bowl, or other toilet fixture, a flushing stream amounting to between 25 and 30 gallons per minute regardless of the pressure in the supply main. These means consist of a casing 50, the outlet end of which is connected to the inlet end of the flush valve by means of a coupling 51, and the inlet end 52 of which is provided with threads for attachment to the supply main. The casing 50 is of angular configuration, and is provided with a valve seat 53 and a throat portion or constriction 54. A disc-like valve member is provided, which member is selectively seatable upon the valve seat 53 to cut off liquid flow or spaceable with respect to the constriction 54 to partially restrict or regulate liquid flow to the flush valve. The valve member is composite in form, being comprised by a fiber washer 55, received between metallic washers 56 and 57, and a hollow wire gauze silencing washer 58 disposed intermediate the upper metallic washer 56 and the shoulder of the valve stem 59. The several washers 55, 56, 57 and 58 are held in concentric assembly upon the shouldered valve stem 59 by a nut 60 threaded thereon. The stem 59 is provided, adjacent its upper end, with threads by which it is adjustably mounted in the head 61 threaded into the casing 50. The stem 59 is slotted at its upper end for reception of a screw driver blade for adjustment purposes, and a packing washer 62 and nut 63 maintain the adjustment and preclude leakage past the stem. A cap 64 encloses the end of the stem 69 and head 61. A spider 65 having radially extending vanes 65a is formed on the head member 61 and serves to break up the stream of liquid issuing through the constriction 54. In Fig. 8, the details of construction of the disc-like cut off and throttling member are shown. It will be noted that the silencing washer 58 is similar in construction to the silencing member 22 of the flush valve in that it comprises a two-ply annulus 58a of wire gauze pressed about a core 58b of solid metal, but spaced therefrom at its extremity to define a hollow space 58c. One distinction exists, however, this being that the core 58b is provided with a serrate peripheral edge, thus increasing the water-perviousness of the washer at this point, an essential feature of the device when used for its present purpose. It might also be explained that the extreme lower edge of the wire-gauze washer 22 and the extreme upper edge of the inverted wire-gauze washer 58 are, though well defined by the dies by which they are formed, not so sharply folded as to render them materially less porous in character than the adjacent unfolded portions of the wire gauze constituting the bodies of the washers. Repeated tests have established that too sharp formation of these edges will provide washers which are not completely silent in all stages of throttling.

Another distinction between the wire gauze washer 22 disclosed as a part of the flush valve and the wire gauze washer 58 employed in the throttling device is that the wire gauze portion 22a of the former has superposed thereon, and pressed partially thereinto, a thin lead washer 22d which holds the portion 22a in shape, as well as renders the upper portion of the washer less liquid-pervious than the lower portions thereof, and thus provides, when assembled with the valve element 21, a substantially uniform gradual reduction in liquid-perviousness from the lower extremity of the washer 22 to the conical portion of the valve element 21. As disclosed in Fig. 8, the silencing washer 58 is not provided with such a lead washer but, to the contrary, has a core 58b provided with peripheral serrations which increase the effective over-all porosity of the wire gauze portion 58a. Moreover, in order not to impede liquid flow through the serrations, the washer 56, by which the portion 58a is held in assembly with the core 58b, is of less diameter than the said portions 58a and 58b.

The mode of operation of the disclosed device, and the manner in which its highly advantageous results are accomplished, is as follows. Assuming the rate of delivery of the supply main is such, (25 to 30 gallons per minute) that the supply to the flush valve need not be choked down, the water passes through the casing inlet 52, valve seat 53, around the unseated cut-off and silencing device consisting of parts 57, 55, 56 and 58, through the constricted portion 54, past the vaned spider 65, and to the flush valve inlet 11. When the plunger pin 27 is manually caused to be projected, the valve stem 26f is tilted, unseating the head 26a of the control valve and allowing a portion of the fluid within the cap 15 to be discharged through the central port in the plunger. The plunger thereupon rises, due to greater pressure upon its under side, and the valve stem 26f clears the plunger pin 27, allowing the valve head 26a to seat. Upward movement of the plunger is almost instantaneous, and liquid is gently and uniformly directed, by the depending flange 16 of the cap 15, around the annular space between the intermediate portion of the valve casing 10 and the flange 16, from whence it passes or "spills", directed by the lower portions of the raised plunger, into and through the convex valve seat 15, the adjacent tapered portion 14 of the casing and the outlet port 12. As is obvious, the extent to which the plunger will rise in the cap 15 is dependent upon the effective length of the control valve stem, and may be regulated by the degree of threaded association of the bushing **26*d* with the tubular stem section 26*b*. Should the control valve tripping plunger 27 be maintained in projected position, no prolongation of the flushing period will be effected, due to the freely slidable disposition of the section 26*f* within the bushing 26*d*, and the venting opening 26*h***.

With the valve provided with the baffle flange 16 spaced from the casing wall as shown, and with the plunger lifted to permit free and full-rate flushing, no sound will be emitted, due to the absence of throttling or flow-restricting throats. However, as the timing chamber within the cap 15 begins to refill through the charging ducts communicating with the inlet port 11, the plunger is slowly caused to descend, and the flow from the inlet port 11 to the outlet port 12 is gradually and progressively checked between the valve seat 13 and the approaching lower portions of the members 22 and 21. The initial reduction in the rate of flow is effected by the approach of the hollow portion of the wire gauze washer 22 to the seat 13, and throttling or flow checking is thus accomplished by a throat, one wall of which is porous, restrictively liquid pervious, or "indistinct" as distinguished from a solid or distinct wall. A small fringing portion of the stream allowed to pass the valve seat 13 is thus separated from the main body of the stream and is of lower velocity than the main body. It is this partial "separation" or "bleeding off", of an edge portion of the flowing jet by the porous throat-fringing wall which, in some as yet not thoroughly understood manner, deprives the jet of its common characteristic of setting up whistling or singing sounds.

As the plunger descends further and further, and the lower edge of the wire gauze washer 22 extends into the convex valve seat 13 and the subjacent tapered portion 14 of the casing wall, the core **22*b* becomes the innermost wall of the throttling throat and the flowing stream is restricted to passage through the diminishing clearance space between the foraminous portion 22*a* and the adjacent casing portions 13 and 14, and through the internal pores or foramina of the portion 22*a* itself. In this and further lower positions, due to the disposition of the hollow portion 22*c* of the washer 22 below the zone of greatest restriction, and the increasingly narrow annular throat limits defined by the valve member 21, lead washer 22*d* and core 22*b* on one side, and the casing portions 13 and 14 on the other, flow is so reduced that syphon action in the discharge trap of the toilet fixture or other appliance is unmaintainable, and the final leak, after syphon action has ceased or broken, is employed to refill the trap. From the time that flow has been so reduced as to preclude syphon action, to the time of the final seating of the concave portion of the member 21 upon its seat 13, the throttling throat is constituted primarily by the lower straight tapered portion of the member 21, the lead washer 22*d*, and the complementarily tapered casing portion 14**. As has been stated before, the taper, for complete silence should be approximately 7%. The position of the parts in completely closed position is illustrated in Figs. 1 and 3.

Due to the more or less vague nature of the phenomena responsible for the generation of sound in throttled ducts for liquids, it is difficult to give a rule by which sizes, shapes and proportions of parts effective to completely preclude all types of sound emission may be determined for any and every given unit without trial. It may, however, be stated that, in the case of a flush valve of general utility, the disclosed valve construction, drawn to scale in Fig. 1, has proven completely successful in operation, being even more quiet than the troublesome and unsightly conventional low tank for which it is intended to be substituted. The feature of gradually decreasing liquid perviousness from the entrant to the valve-adjacent portion of the porous silencing element is probably the most important factor in obtaining silent action in all stages of throttling. While this may be effected in a number of ways, the die-formation of the silencing element as a hollow, partially cored multiple wire-gauze annular washer has proven most successful from the standpoint of quantity production. Moreover, this form of silencing member has the additional characteristic advantage of being self-cleaning; any material, solid or plastic, lodging therein or thereon being automatically removed by the high velocity stream passing across and through the element when in use. However, I have found that desirable silencing may be obtained when the hollow annular washer formed of wire gauze is completely filled with a solid core, so as not to leave any space such as that indicated by the reference numeral **22*c***. From this I am led to believe that the silencing is due to the surface characteristics of the member and that the provision on the silencing member of an irregular surface having the characteristics of the surface of a sheet of woven wire gauze is of prime importance. Whenever, in this specification and claims, I refer to a hollow annular washer of wise gauze, it is to be understood that I have reference to the fact that the wire gauze is so formed as to provide a space in the interior of the annular washer, which may be filled fully or in part by a core.

Another feature of the disclosed flush valve is the uniformity of flush accomplished thereby. A common source of impaired action in similar devices results from the tendency of the timing chamber refill ducts to become partially clogged with solid particles or impurities suspended in the water from the supply main. This tendency is precluded in the present construction by reason of three features therein embodied. First, the several passages comprising the charging duct are, in the order of their sequence, progessively enlarged, the inlet end constituted by the 1/64 of an inch clearance between the plunger skirt member 20 and the flange 16 being so small as to preclude the entry of any but the very finest particles; the branch ducts 29 being 1/16 of an inch in diameter; the annular recess 30 being even larger; the bore in the tubular projection 31 being approximately $\frac{3}{32}$ of an inch in diameter; and the final passageway in the member 36 having a diameter of approximately ⅛ of an inch. Secondly, the balls 35, by their oscillating movements dislodge any deposit tending to form in the recess 33. And thirdly, any tendency of particles to become lodged at the inlet end of the charging duct or to collect in the form of a deposit around the piston skirt 20 is precluded by the wiping action of the flange 16 thereagainst. By reason of the diametrically opposed relationship of the ducts 29 with respect to each other, the plunger may be rotated to any position in the cylinder 16, and the greater proximity of one duct 29 to the inlet port 11 will be compensated by the reduced proximity of the other duct 29 thereto. In this way substantially perfect balance is effetced and the valve, once the bushing 26*d* is set to provide a predetermined optimum flush, will continue to do so with a variation of less than a pint from the setting. I consider this construction, providing effective flushing without waste of water, to be one of the salient features of my invention.

Another very important feature of my invention is the disclosed pitless control valve. One of the most common troubles in valves of similar design is that due to pitting of the seating edge of the chamber relief or control valve head usually made of brass. This I have found to be due, not so much to the corrosive nature of the water employed for flushing, but rather to the sulphur content of the vulcanized rubber washer commonly employed as its valve seat. Numerous expedients have been tried to eliminate this cause of failure, among them being the use of special non-corrosive metals as the valve material and as coatings therefor. These expedients, however, have met with but partial success. My control valve comprises a metallic stem formed into a spider at its upper end, and having its head molded thereon of sulphur- or sulphurous-acid-resistant phenol-formaldehyde composition. Prolonged use has demonstrated conclusively that the present control valve will not pit, warp, or chip in use.

While the flush valve construction, the operation of which has just been explained, is completely quiet and satisfactory when supplied with a normal liquid delivery of 25 to 30 gallons per minute, such deliveries are the exception rather than the rule in large cities, and some means must generally be used therewith to reduce the normally high delivery rate from the usual city mains. Such an auxiliary device is shown associated with the flush valve disclosed in Fig. 1 and has been described. In its position shown in Fig. 1, that is, with the parts 55, 56 and 58 disposed substantially midway between the valve seat 53 and constriction 54, little or no reduction in flow will be effected. However, upon bringing these parts more closely toward the constriction 54, throttling or reduction of the flow through the casing will be effected. It is to be noted that the throat thus constituted will, by reason of the bulbous character of the casing wall intermediate the seat 53 and constriction 54, cause the liquid to flow centripetally as well as axially with respect to the stem 59, so that an edge portion of the liquid jet confined by the casing wall with its constriction 54, and the solid washers 55, 56 and core 58*b*, will pass across and through the wire gauze portion 58*a* of the washer 58. The silencing action of this throat-fringing washer 58 is much the same as that of the washer 22 of the flush valve proper, with the exception that a somewhat larger amount of liquid is passed therethrough by reason of the reduced diameter of the washers 55 and 56 and the peripherally serrate character of the core 58*a*. As is obvious, the extent of throttling is determined by the proximity of the parts 55, 56 and 58 to the casing constriction 54, maximum throttling for extremely high main pressures being effected with the washer 58 partially disposed within the constriction 54, and flow therethrough for the most part than taking place through the wire gauze portion 58*a*. The spider 65, with its radial vanes 65*a*, breaks up any tendency toward the generation of noise known as a "shot effect" caused by the unitary impact of the liquid jet issuing through the constriction 54. For the purpose of temporarily completely cutting off flow to the flush valve proper so that adjustments or repairs may be made therein, the washer 56 of fibre may be seated upon the valve seat 53 by screwing downwardly the stem 59.

While I have disclosed and described my invention as embodied in a liquid-metering flush valve construction, it is to be clearly understood that the silencing feature thereof is in no sense limited to use in liquid flush valves. In its broad sense my silencing device is applicable to all forms of devices in which throttling of a liquid stream is effected by a constricted casing or throat-defining element, either of fixed or adjustable character. Likewise, the wire gauze disc-like silencing element which I regard as the preferred embodiment of my invention is not limited to original installation in new valves, but may be installed in valves of conventional form already in service. I therefore claim my invention broadly, as indicated by the appended claims.

What I claim is:

1. A silent throttling device for a high-pressure liquid supply line comprising a casing adapted for connection into said line and provided with a passageway constituting, when installed, a portion of said line, a throttling member disposed within said casing and extending partially across said passageway to define a restricted throat therein, the cross-sectional area or effective orifice of which is materially less than the mean cross-sectional area of the supply line, and silencing means for precluding the emission of sound at said throat due to high-velocity liquid flow therethrough, comprising a liquid-pervious element fringing the throat-defining wall.

2. A silent throttling device for a high-pressure liquid supply line comprising a casing adapted for connection into said line and provided with a passageway constituting, when installed, a portion of said line, a throttling member disposed within said casing and extending partially across said passageway to define a restricted throat therein, the cross-sectional area or effective orifice of which throat is materially less than the mean cross-sectional area of the supply line, and silencing means for precluding the emission of sound at said throat due to high-velocity liquid flow therethrough, comprising a facing for a portion of said throat having an irregular wall of the character of the surface of woven wire gauze.

3. A silent throttling device for a high-pressure liquid supply line comprising a casing adapted for connection into said line and provided with a passageway constituting, when installed, a portion of said line, a throttling member disposed within said casing and extending partially across said passageway to define a restricted throat therein, the cross-sectional area or effective orifice of which is materially less than the mean cross-sectional area of the supply line, and silencing means for precluding the emission of sound at said throat due to high-velocity liquid flow between the walls thereof, said silencing means comprising a facing of foraminous material upon at least one of the walls defining said throat.

4. A device for choking down liquid flow from a high-pressure liquid supply line without the emission of sound comprising a casing adapted for connection to the supply line and provided with a passageway of circular cross-section through which liquid from said line is directed, a disk-like member within said casing concentrically disposed with respect to the wall of said passageway and defining therewith a restricted throat by which liquid flow is choked down and means associated with said member for precluding the emission of sound due to liquid flow through said throat, said means comprising an annular member formed of woven wire fabric concentrically assembled with said disk-like member in fringing relation thereto, and constituting an indistinct throat-defining wall.

5. A device for reducing the rate of flow in liquid supply lines connected to high-pressure sources of supply without the emission of sound comprising a casing having a liquid passageway therethrough and adapted for interposition in the supply line as part thereof, which casing is provided with an internal shoulder defining a circular constriction in said passageway intermediate its inlet and outlet ends, a disk-like member disposed in said passageway at the inlet side of said shoulder, said disk-like member being concentrically disposed with respect to said shoulder and defining therewith an annular flow-choking throat and means associated with said disk-like member for precluding the emission of sound due to liquid flow through said annular throat, said means comprising a washer of foraminous material concentrically carried by said disk-like member and extending partially into the annular space intermediate said disk-like member and said shoulder to constitute an indistinct throat-defining wall.

6. An adjustable valve for reducing the rate of flow in liquid supply lines connected to high-pressure sources of supply without the emission of sound comprising a valve casing having a liquid passageway therethrough and adapted for interposition in the supply line as a part thereof, which casing is provided with an internal shoulder defining a circular constriction in said passageway intermediate its inlet and outlet ends, a flow-reducing valve element associated with said shoulder, said valve element comprising a disk-like head portion disposed in said passageway at the inlet side of said shoulder and a valve stem threaded through said casing for adjustably and concentrically spacing said head portion with respect to said shoulder to define an annular flow-choking throat, and means associated with said disk-like head portion for precluding the emission of sound due to liquid flow through said annular throat, said means comprising a washer formed of foraminous material, concentrically carried by said disk-like head portion and extending partially into the annular space intermediate said disk-like head portion and said shoulder to constitute an indistinct throat-defining wall.

7. A silent valve for liquid supply lines comprising a valve casing having a liquid passageway therethrough, which casing is provided with an internal shoulder constituting an annular valve seat, a disk valve cooperative with said seat, and means for precluding the emission of sound due to liquid flow through the space between said seat and valve, when the latter is unseated, said means comprising an annular member having a peripheral surface of the character of the surface of a sheet of woven wire gauze, concentrically attached to the seating side of said disk valve within the confines of its annular seating face and snugly but freely receivable within the internal shoulder of said valve casing when said valve is in partially seated positon.

8. A silent valve for liquid supply lines comprising a valve casing provided with an internal shoulder constituting an annular valve seat, a disk valve cooperative with said seat to completely cut off liquid flow therethrough and retractable from said seat in substantially non-restrictive positon, and means for precluding the emission of sound due to restricted liquid flow as said valve approaches its seat, said means comprising an annular core and a hollow annular washer of wire gauze embracing said core, concentrically attached to the seating side of said disk valve, within the confines of its annular seating face, and snugly but freely receivable within the internal shoulder of said valve csaing as said valve closely approaches its seat.

9. A silent valve for liquid supply lines comprising: a valve casing having a liquid passageway therethrough, which casing is provided with an internal shoulder constituting an annular valve seat, a disc valve cooperative with said seat to completely stop liquid flow through said passageway and retractible from said seat into substantially non-restrictive position, and means for precluding the emission of sound due to restricted liquid flow when said valve is in an intermediate position, said means comprising a hollow annular washer of wire gauze concentrically attached to the seating side of said disc valve within the confines of its annular seating face and snugly but freely receivable within the internal shoulder of said valve casing as said valve closely approaches its seat.

10. A device for adjustably controlling the rate of liquid delivery to metering flush valves and similar devices without the emission of wire-drawing and other noises comprising: a casing adapted for disposition intermediate the flush valve and its liquid supply line, which casing has a liquid passageway therethrough provided, intermediate its inlet and outlet ends, with an internal shoulder defining a circular constriction therein, a disc-like member concentrically mounted at the inlet side of said shoulder and adjustably spaceable with respect thereto to control the rate of liquid flow through said passageway, and means for precluding the emission of sound due to liquid flowing in jet formation through said passageway, said means comprising a foraminous washer concentrically carried by said disc-like member and extending into the annular space defined by said member and said shoulder, and a radially vaned spider disposed in said passageway between the outlet end thereof and said shoulder to break up the unitary form of the liquid jet issuing from said constriction.

11. A combined shut-off and regulating device for adjustably controlling the rate of liquid delivery to metering flush valves and similar devices without the emission of wire-drawing and other noises comprising: a casing adapted for disposition intermediate the flush valve and its liquid supply line, which casing has a liquid passageway therethrough provided, intermediate its inlet and outlet ends with a spaced pair of internal shoulders, one of which constitutes a valve seat for the shut-off element, and the other of which constitutes a flow-determining constriction in said passageway, a disc-like member concentrically mounted in the space between said shoulders and selectively seatable against said valve-seat-constituting shoulder to completely shut off flow to said flush valve or adjustably spaceable with respect to said other shoulder to regulate the rate of flow to said flush valve, and means for precluding the emission of sound due to high-velocity liquid flow through the annular space between said disc-like member and said constriction-constituting shoulder, said means comprising a hollow foraminous washer concentrically carried by said disc-like member and extending into said annular space.

12. A combined shut-off and regulating device for adjustably controlling the rate of liquid delivery to metering flush valves and similar devices without the emission of wire-drawing and other noises comprising: a casing adapted for disposition intermediate the flush valve and its liquid supply line, which casing has a liquid passageway therethrough provided, intermediate its inlet and outlet ends, with a spaced pair of internal shoulders, one of which constitutes a valve seat for the shut-off element, and the other of which constitutes a flow-determining constriction in said passageway, a disc-like member concentrically mounted in the space between said shoulders and selectively seatable against said valve-seat-constituting shoulder to completely shut off flow to said flush valve or adjustably spaceable with respect to said other shoulder to regulate the rate of flow to said flush valve, and means for precluding the emission of sound due to high-velocity liquid flow through the annular space between said disc-like member and said constriction-constituting shoulder, said means comprising a hollow and porous member consisting of an annulus of wire gauze die-formed about a core having the form of a peripherally serrate disc, said hollow and porous member being concentrically carried by said disc-like member and extending into said annular space.

13. A silencing element for eliminating throttling sounds in valves of the type having a casing provided with an internal annular shoulder and a disc-like valve element adjustably spaceable with respect to said shoulder comprising: a washer of substantially the same size as the internal diameter of said shoulder, and adapted for concentric attachment to the shoulder-adjacent face of said valve element, said washer having a peripheral surface of the character of a sheet of woven wire gauze.

14. A silencing element for eliminating throttling sounds in valves of the type having a casing provided with an internal annular shoulder and a disc-like valve element adjustably spaceable with respect to said shoulder comprising: a hollow wire-gauze washer of substantially the same size as the internal diameter of said shoulder and adapted for concentric attachment to the shoulder-adjacent face of said valve element.

15. A silencing element for eliminating throttling sounds in valves of the type having a casing provided with an internal annular shoulder and a disc-like valve element adjustably spaceable with respect to said shoulder comprising: a hollow wire-gauze washer of substantially the same size as the internal diameter of said shoulder and adapted for concentric attachment to the shoulder-adjacent face of said valve element, said washer having its greatest thickness adjacent its periphery and having incorporated therein a solid disc-like core which fills the central portion of the hollow space within the washer.

16. A silencing element for eliminating throttling sounds in valves of the type having a casing provided with an internal annular shoulder and a disc-like valve element adjustably spaceable with respect to said shoulder comprising: a hollow wire-gauze washer of substantially the same size as the internal diameter of said shoulder and adapted for concentric attachment to the shoulder-adjacent face of said valve element, said washer having its greatest thickness adjacent its periphery and having incorporated therein a solid, peripherally serrate, disc-like core which fills a portion of the hollow space within the washer and renders the washer decreasingly liquid-pervious from its periphery to its central portion.

17. In a liquid-metering flush valve, a casing having an inlet port, an outlet port and a valve seat intermediate said ports, a main valve element associated with said seat, a timing chamber connected with said inlet port by a restricted charging duct, a control valve governing a discharge port in said chamber, said discharge port being of greater capacity than the charging capacity of said duct and, when opened, effecting a reduction of fluid pressure in said chamber, hydrostatic means associated with said timing chamber and subject to pressures therein, said hydrostatic means opening said main valve when the chamber pressure falls below the pressure in the inlet port and closing said main valve as the chamber pressure becomes equalized with the pressure in the inlet port, and means for precluding the emission of sound due to the throttling action of said main valve while in partially closed position comprising a hollow washer of wire-gauze carried by said main valve and movable, in accordance with the position thereof relative to its valve seat, into and out of close association with the casing wall defining the outlet port of the main valve.

18. In a liquid-metering flush valve, a casing having an inlet port, an outlet port and an annular valve seat intermediate said ports, said valve seat having a convex seating edge merging, with a slight straight taper, into the casing wall defining said outlet port, a timing cylinder disposed over and alined with said valve seat, a plunger movable in said cylinder, said plunger comprising a body portion snugly and guidingly received in said cylinder, a concave valve portion seatable upon said valve seat and a slightly conical sound-precluding portion beneath said valve portion and snugly receivable within said outlet port when said valve portion is seated, said sound-precluding portion having a peripheral surface of the character of the surface of a sheet of woven wire gauze, and means for effecting pressure changes within said timing chamber to actuate said plunger.

19. In a liquid-metering flush valve, a casing having an outlet port, an inlet port disposed at an angle with respect to said outlet port, and an annular valve seat adjacent said outlet port, said valve seat having a convex seating edge merging, with a slight straight taper, into the casing wall defining said outlet port, a detachable cap for said casing, which cap is provided with a cylindrical flange alined with said valve seat and extending partially across said inlet port in spaced relation with the walls of said casing proper to constitute a baffle providing an annular passageway for gently directing liquid entering through said inlet port substantially uniformly around and through said valve seat and outlet port, said cap and its flange also constituting a timing cylinder, a plunger movable in said cylinder, said plunger comprising a body portion snugly and guidingly received in said cylinder, a valve portion seatable upon said valve seat and terminating in a slightly conical portion, and a valve silencing portion consisting of a further conical element having a peripheral surface of the character of the surface of a sheet of woven wire gauze and constituting an extension of said valve portion, said valve and silencing portions being complementary to said valve seat and adjacent tapered casing wall, and means for effecting pressure changes within said timing cylinder to actuate said plunger.

20. In a liquid-metering flush valve, a casing having an outlet port, an inlet port and an annular valve seat adjacent said outlet port, a detachable cap for said casing, which cap is provided with a cylindrical flange alined with said valve seat and extending partially into said inlet port and constituting a timing cylinder, a plunger valve having a head portion slidably received in said timing cylinder, a skirt portion beneath said head portion, a valve portion seatable upon said valve seat and means formed therein for charging said timing chamber with liquid from said inlet port, said means comprising an annular recess formed in said skirt portion above its lower extremity and encircled by the lower extremity of said cap flange, and a duct formed in said plunger and joining said recess with said timing cylinder, said skirt portion and adjacent portion of said cap flange having a clearance less than the diameter of said duct and constituting a self-cleaning filter therefor, precluding the entry of solid particles capable of clogging said duct, and means for venting said timing cylinder at a higher rate than the charging rate of said duct to lift said plunger and unseat said valve.

21. In a liquid-metering flush valve, a casing having an outlet port, an inlet port disposed at an angle with respect to said outlet port and an annular valve seat adjacent said outlet port, a detachable cap for said casing, which cap is provided with a cylindrical flange alined with said valve seat and extending partially across said inlet port in spaced relation with the walls of the casing proper to constitute a baffle providing annular passageway for gently and substantially uniformly directing liquid entering through said inlet port around and through said valve seat and outlet port, said cap with its flange also constituting a timing cylinder, a plunger valve having a head portion slidably received in said timing cylinder, a skirt portion beneath said head portion, a valve portion seatable upon said valve seat, and means formed therein for charging said timing chamber with liquid from said inlet port, said means comprising an annular recess formed in said skirt portion above its lower extremity and encircled by the lower extremity of said cap flange, and a plurality of timing-cylinder charging ducts communicating with said annular recess at uniformly spaced points about its circumference so that the rate of timing-cylinder charging is uniform regardless of the position of any of said ducts with respect to the inlet port, and means for venting said timing cylinder at a higher rate than the combined charging rate of said ducts to lift said plunger and unseat said valve.

22. In a liquid-metering flush valve, a casing having an outlet port, an inlet port disposed at an angle with respect to said outlet port and an annular valve seat adjacent said outlet port, a detachable cap for said casing, which cap is provided with a cylindrical flange alined with said valve seat and extending partially across said inlet port in spaced relation with the walls of the casing proper to constitute a baffle providing annular passageway for gently and substantially uniformly directing liquid entering through said inlet port around and through said valve seat and outlet port, said cap with its flange also constituting a timing cylinder, a plunger valve having a head portion slidably received in said timing cylinder, a skirt portion beneath said head portion, a valve portion seatable upon said valve seat, and self-cleaning means formed therein for charging said timing chamber with liquid from said inlet port, said means comprising an annular recess formed in said skirt portion above its lower extremity and encircled by the lower extremity of said cap flange, and a plurality of timing-cylinder charging ducts communicating with said annular recess at uniformly spaced points about its circumference so that the rate of timing-cylinder charging is uniform regardless of the position of any of said ducts with respect to the inlet port, said skirt portion and adjacent portion of said cap flange having a clearance less than the diameter of said ducts and constituting a self-cleaning filter therefor, precluding the entry of solid particles capable of clogging either of said ducts, and means for venting said timing cylinder at a higher rate than the combined charging rates of said ducts to lift said plunger and unseat said valve.

23. A main valve unit for liquid-metering flush valves comprising: a body portion having a central aperture therethrough and provided at its upper end with an annular recess, an annular vulcanized rubber ring retained within said recess and constituting a seat for the timing chamber control valve, a control valve comprising a metallic stem portion terminating, at its upper end, in a central knob and a radially extending spider and a head portion of sulphur-resistant phenol-formaldehyde composition molded about said spider and seated upon said vulcanized rubber ring, and a U-shaped spring clip of non-corrosive resilient metal having its ends detachably engaged with said plunger body and having its central portion bearing upon said valve knob and holding said control valve and plunger body in assembly with said control valve head in yieldably seated relation with said rubber ring.

24. An adjustable timing chamber control valve for liquid-metering flush valves comprising a head portion and an adjustably extensible depending stem, said stem consisting of an internally threaded tubular portion rigid with said head portion, a bushing threaded into the lower portion of said tubular portion and adjustable lengthwise thereof, a locking member for maintaining said adjustment, and a pin-like stem section having a shank portion snugly disposed and slidable within said bushing and having a head portion within said tubular portion and seatable upon the upper end of said bushing and by reason of which said bushing adjustment determines the maximum length of said stem.

25. In a liquid-metering valve, a casing having an outlet duct, an inlet duct terminating in a passage coaxially disposed with respect to said outlet duct, of larger diameter than said outlet duct, and so formed as to gently and smoothly direct liquid from said inlet duct centripetally and axially into said outlet duct in a substantially uniform cone-like annular stream converging in said outlet duct, a non-projecting convex annular valve seat at the head of said outlet duct, said valve seat having its rounded edge merged with the adjacent walls of said inlet and outlet ducts and offering no sharp obstruction to liquid flow from said inlet to said outlet duct, said valve-seat-adjacent portion of said outlet duct being somewhat enlarged and having a slight straight taper in the direction of flow and merging at its large end with said convex valve seat and at its small end with said outlet duct proper, and a valve member axially movable into and out of seating relation with said valve seat, said valve member comprising a slightly conical pre-entrant throttling portion complementary to said valve-seat-adjacent straight tapered portion of said outlet duct, and a final seating portion of concave cross-section complementary to said convex annular valve seat and merging with said conical pre-entrant throttling valve portion.

26. In a liquid-metering valve of the type employing hydrostatic means actuated by supply line pressure to close the valve proper, clog-resistant timing means for uniform restrictive delivery of liquid from the supply line to said hydrostatic means comprising: a metering chamber and a metering ball loosely disposed within said chamber, said chamber having, adjacent its bottom, an inlet duct communicating with said supply line and having, at its top, an outlet duct communicating with said hydrostatic means and terminating at its chamber end in an imperfect seat against which said metering ball is lifted and held by liquid flow through said chamber, said outlet duct being larger than the clearance between said ball and chamber, said inlet duct being progressively larger from its intake to its outlet ends, and the clearance between said ball and chamber being such as to preclude permanent lodging therein of any particle capable of entry through said inlet duct.

27. In a liquid-metering valve of the type employing hydrostatic means actuated by supply line pressure to close the valve proper, clog-resistant timing means for uniform restrictive delivery of liquid from the supply line to said hydrostatic means comprising: a metering chamber and a metering ball loosely disposed within said chamber, said chamber having, adjacent its bottom, an inlet duct communicating with said supply line and having, at its top, an outlet duct communicating with said hydrostatic means and terminating at its chamber end in an imperfect seat against which said metering ball is lifted and held by liquid flow through said chamber, said outlet duct being larger than the clearance between said ball and chamber, said inlet duct being progressively larger from its intake to its outlet ends, and the clearance between said ball and chamber being such as to preclude permanent lodging therein of any particle capable of entry through said inlet duct, and means for effecting scouring of the chamber walls comprising a second ball, similar to the first and disposed therebeneath in said chamber.

28. A unit-replaceable piston valve for liquid-metering flush valves of the type including a main valve seat intermediate inlet and outlet ports and a timing cylinder alined with said valve seat, comprising: a piston snugly receivable and axially movable in the cylinder of such a flush valve and having a central timing chamber discharge port therethrough normally closed by a mushroom valve seatable upon the piston head and having a tiltable stem depending through and below said discharge port and adapted for valve-head-unseating engagement by the conventional trip plunger of such a flush valve, said piston having its side wall provided with a plurality of shallow slots extending downwardly from its head, each terminating at its lower end in a radially inwardly extending notch several times as deep as the associated slot, and means associated with said slots and notches for maintaining said valve and piston in assembly and for yieldingly holding said valve tightly seated upon the head of said piston, said means comprising a spring clip of non-corrosive resilient material having leg portions snugly disposed wholly within said slots and terminating in inturned toe portions engaged under tension within the notches of said piston, and a central portion overlying the piston head in spaced relation thereto resiliently contacting the head of said mushroom valve solely at its center.

29. A unit-replaceable piston valve for liquid-metering flush valves of the type including a main valve seat intermediate inlet and outlet ports and a timing chamber above said valve seat, comprising: a main valve member adapted for installation in said timing chamber and movable into and out of seating relation with said valve seat in accordance with differential pressures, said main valve having a timing chamber discharge port therethrough and an annular recess formed about said discharge port, an annular semi-hard vulcanized rubber ring retained within said recess and constituting a yieldable control valve seat, and a tiltable mushroom valve normally seated upon said rubber ring to maintain said timing chamber filled with liquid and comprising a metallic stem depending through said discharge port for engagement by the conventional trip means of such a flush valve, a spider portion radiating from the upper end of said stem and a disk-like head portion of sulphurous acid resistant phenol-formaldehyde composition integrally molded about and encasing said spider and provided with an annular seating face normally contacting said vulcanizer rubber ring in the presence of a film of water.

30. A device as specified in claim 2, adapted for use as a metering flush valve, in which the said casing includes a part forming a wall portion of an outlet-port portion of said passageway and having a valve-seat shoulder extending about said outlet-port, and in which said throttling member comprises a valve part which is adjustable axially relative to said port into and out of position to close said port and which includes a shoulder in abutting relation with the first mentioned shoulder, and which also includes a portion moved into and out of said port as said valve part is adjusted into and out of its port closing position, said last mentioned portion having a peripheral wall which, in the port closing position of the valve part is closely adjacent and enveloped by the wall portion of said casing, and in which said silencing means is carried by one of the above mentioned valve and casing parts, and in which the said restricted throat is defined by said casing and valve parts as the latter approaches its port closing position.

FREDERICK C. BINNALL.